United States Patent
McAtarian

[19]

[11] Patent Number: 6,112,930
[45] Date of Patent: Sep. 5, 2000

[54] LAND-BASED SPILL COLLECTION SYSTEM

[75] Inventor: Mark F. McAtarian, Rutherford, N.J.

[73] Assignee: Andax Environmental Corporation

[21] Appl. No.: 08/151,960

[22] Filed: Nov. 15, 1993

[51] Int. Cl.[7] .................................... B65D 1/37
[52] U.S. Cl. ................... 220/9.1; 220/9.2; 4/585
[58] Field of Search ............. 220/9.1, 9.2, 565, 220/571, 573, 666, 904; 4/585, 587

[56] References Cited

U.S. PATENT DOCUMENTS

| | | | |
|---|---|---|---|
| 92,364 | 7/1869 | Rider | 4/585 X |
| 216,227 | 6/1879 | Sedgwick | 220/9.2 X |
| 608,998 | 8/1898 | Apthorp | 220/9.2 |
| 1,583,083 | 5/1926 | Macaraig | 220/9.2 |
| 2,042,288 | 5/1936 | Bach et al. | 220/9.2 X |
| 2,150,620 | 3/1939 | Frost | 220/9.2 |
| 3,014,516 | 12/1961 | Mueller | 220/9.2 |
| 5,316,175 | 5/1994 | Van Romer | 220/573 |

*Primary Examiner*—Steven Pollard
*Attorney, Agent, or Firm*—Siegmar Silber

[57] ABSTRACT

This invention relates to a collapsible spill-collection tank constructed from flexible material with spring operated walls. More particularly, the invention is of a spill-collection tank dimensioned to fold to within 30% of the fully opened size thereof and stow readily on board a truck. After use, the spill-collection tank can be suitably cleaned, and, with the springs restored to the tensioned, ready-to-pop-up condition, the unit can be re-folded and stored.

20 Claims, 2 Drawing Sheets

LAND-BASED SPILL COLLECTION SYSTEM

BACKGROUND OF THE INVENTION

1. Field of the Invention

This invention relates to a collapsible spill-collection tank constructed from flexible material with spring-operated walls. More particularly, the invention is of a spill-collection tank dimensioned to fold to within 30% of the fully opened size thereof and to stow readily on board a truck. After use, the spill-collection tank can be suitably cleaned, and, with the springs restored to the tensioned, ready-to-pop-up condition, the unit can be re-folded and stored.

2. Information Disclosure Statement

It is a common occurrence for trucks, whether involved in a traffic accident or not, to have problems with leaking fuel tanks whereby quantities of gasoline or diesel fuel are spilled. In recent years, the most popular preventative measure is to carry an emergency spill kit such as the one manufactured by Andax Environmental Corporation, the assignee hereof. This kit provides barriers to prevent the fuel reaching storm drains and absorbents and other clean up materials. In today's environmentally conscious society, such provisions are inadequate, and a spill-collection tank suitable for stowage on a truck is indicated.

In preparing for this application, several patents became known to the inventor hereof by the review of the following classes and subclasses.

CLASS/SUBCLASS

206/522
137/312
141/114
220/573
220/666

The review caused the following patents to become known to the Applicant hereof:

| ITEM NO. | U.S. Pat. No. | INVENTOR | ISSUE DATE |
| --- | --- | --- | --- |
| 1 | 2,854,049 | S. S. Wyllie | 09/30/1958 |
| 2 | 3,272,373 | J. H. Alleaume et al. | 09/13/1966 |
| 3 | 4,715,417 | W. H. Coloney | 12/29/1987 |
| 4 | 4,858,755 | L. J. Kuivanen | 08/22/1989 |
| 5 | 4,932,558 | W. Katavolos | 06/12/1990 |
| 6 | 5,090,588 | Van Romer et al. | 02/25/1992 |
| 7 | 5,099,872 | Tarvin et al. | 03/31/1992 |

S. S. Wyllie, U.S. Pat. No. 2,854,049—Issued Sep. 30, 1958
Discloses a tank with walls which are not inflatable, but merely show two interconnected concentric rings, the smaller of which floats on the fluid contained and erects the vessel wall.

J. H. Alleaume et al., U.S. Pat. No. 3,272,373 Issued Sep. 13, 1966
Discloses a flexible tank for use in a ship's hull, which tank has inflatable ribs and a flexible body.

W. H. Coloney, U.S. Pat. No. 4,715,417—Issued Dec. 29, 1987
Discloses an aircraft fuel tank with inflatable ribs capable of mounting on the exterior of a plane.

L. J. Kuivanen, U.S. Pat. No. 4,858,755—Issued Aug. 22, 1989
Discloses an inflatable display container having upper and lower inflatable rings interconnected by four inflatable corner posts.

W. Katavolos, U.S. Pat. No. 4,932,558—Jun. 12, 1990
Discloses a liquid-containing tank with sidewalls constructed from a flexible material filled with liquid.

Van Romer et al., U.S. Pat. No. 5,090,588—Feb. 25, 1992
Discloses a portable containment vessel with resilient side braces that is designed for collecting residual flow from crop-dusting aircraft and preventing water-dispersible pesticides from entering the ground water.

Tarvin et al., U.S. Pat. No. 5,099,872—Mar. 31, 1992
Discloses a containment vessel of flexible material which is basically a large inflatable funnel.

None of the patents reviewed disclosed the device described in detail hereinbelow. While several of the devices disclosed, show inflatable structures, most of the inflatable structures lack the structural integrity created by the spring truss of the present disclosure. This truss forms a cantilevering beam by which the tank can be readily and appropriately positioned.

SUMMARY

In general terms, the invention disclosed hereby includes a spill-containment tank for a spill-kit employed especially by a truck operator. The tank is in folded form, and, upon erection, provides a container for receiving diesel fuel or other liquids escaping from the truck. The device has a sidewall that is supported in a substantially rigid form by a spring truss and is capable, in one form thereof, of containing about 150 gallons of spillage. The sidewall is formed from two sheets of diesel-fuel-resistant, thermoplastic laminated material, preferably nylon laminated in a urethane base. In the sidewall, a pocket is formed and has an inner facing of flexible material contiguous to and continuous with an outer facing of flexible material. The spring truss is fitted within the pocket and forms a wall erecting mechanism. The spring truss is vertically expandable within the pocket and erects the wall with sufficient tension to resist, when the spill-containment tank formed thereby is filled with spilled liquid, significant diminution of the wall height. Upon erection of the sidewall by the spring truss and before filling with spilled liquids, the tank can be readily positioned to receive spilling liquids by supporting and raising one portion of the truss and shifting the remaining portion of the tank. During this procedure, the truss acts as a beam which cantilevers the unsupported load.

OBJECTS AND FEATURES OF THE INVENTION

It is an object of the present invention to provide a spill-collection tank suitable for stowage on a truck and for collecting spilled gasoline or diesel fuel.

It is a further object of the present invention to provide a spill-collection tank which, upon unfolding and releasing of the sidewall springs, pops up and is ready for use.

It is yet another object of the present invention to provide a spill-collection tank which is easy and economical to manufacture.

It is still yet another object of the present invention to provide a spill-collection tank which may be used, cleaned, and re-used.

It is a feature of the present invention that the spill-collection tank can be readily moved after erection and before receiving significant amounts of spillage.

It is another feature of the present invention that the sidewall springs of the spill-collection tank, upon expansion within the sidewall pocket, erect the wall with sufficient tension to resist significant diminution of wall height when the tank is filled with spilled liquid.

Other objects and features of the invention will become apparent upon review of the drawings and the detailed description which follow.

BRIEF DESCRIPTION OF THE DRAWINGS

In the following drawings, the same parts in the various views are afforded the same reference designators.

DESCRIPTION OF THE PREFERRED EMBODIMENT

The land-based spill collection tank in accordance with the present invention is effective to confine and collect liquids leaking from a wide variety of different types of containers for a wide variety of situations and in a wide variety of surroundings. Although widely applicable, this invention is directed toward trucks and, specifically to truck fuel leaks. As mentioned in the introductory comments, it is a common occurrence for trucks, whether involved in a traffic accident or not, to have problems with leaking fuel tanks whereby quantities of gasoline or diesel fuel are spilled. This invention provides a spill-collection tank suitable for stowage on a truck.

Figure 1:
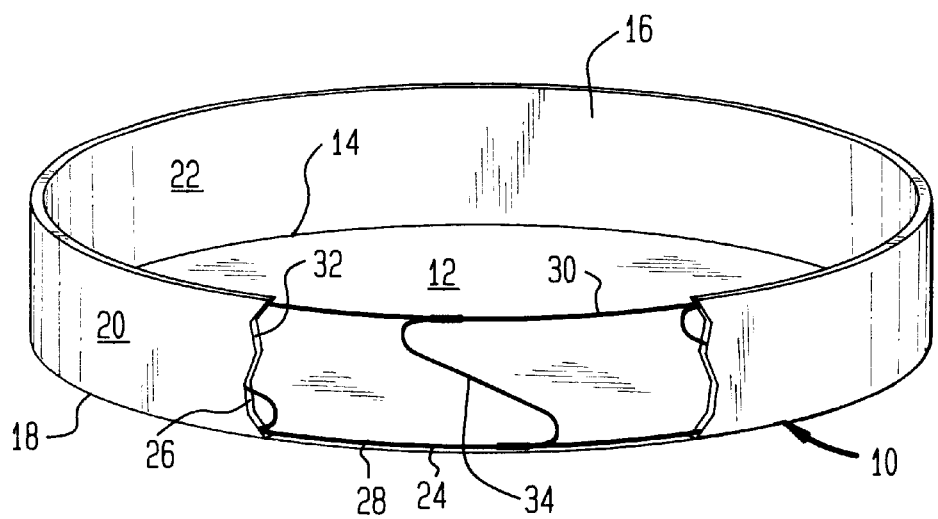
FIG. 1 is a perspective view of the spill-collection tank of the present invention in the erected condition, and is shown with the sidewall partially broken away to illustrate the spring assembly thereof.

Referring now to FIG. 1, a spill-collection tank of this invention is shown and is indicated by the reference numeral 10. The tank 10 has a base 12 formed from a flexible material. For purposes of strength, chemical resistance, and reusability, a fabric—woven or non-woven—is laminated in a thermoplastic. Here a woven nylon web is used, and the nylon is laminated in urethane film, Catalog No. MP 1880 (manufactured by JPS Elastomerics Corporation, Urethane Products Div., Northampton, Mass. 01060 or equivlent) is used. This thermoplastic material has been selected for the specific parameters—resistance to fuels, especially gasoline and diesel fuel; tear resistance; flexibility; cleanability; and, weight. To the perphery 14 of the base 12, a sleeve-type or two-ply sidewall 16 is attached along base seam 18. The sidewall 16 material is the same as the base material; however, for other parameters, a different thermoplastic can be utilized on both or either portion. In the illustration in FIG. 1, a portion of sidewall 16 is broken away so that the structure can be clearly seen. The sidewall 16 has an outer facing 20 and an inner facing 22. Between facings 20 and 22, a spring assembly 24 is disposed in a pocket 26. As is also seen in this view, the spring assembly 24 has two bands or rings, namely, lower band 28 adjacent seam 18 and upper band 30 in the upper portion 32 of pocket 26. A plurality of springs 34 interconnects bands 28 and 30.

Figure 3:
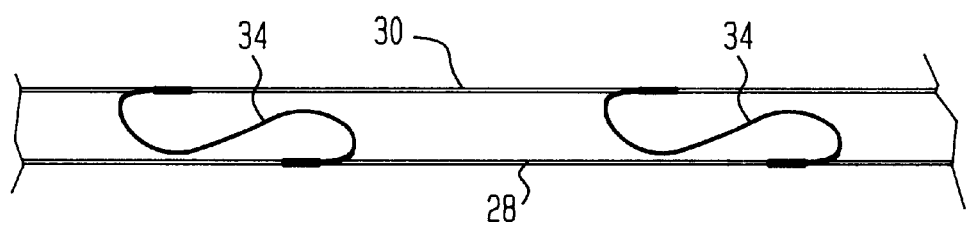
FIG. 3 is a partial front elevational view of the spring assembly of the FIG. 1 and shows the details of the interconnection of the upper and the lower rings when the spill-collection tank is in the folded condition.
Figure 2:
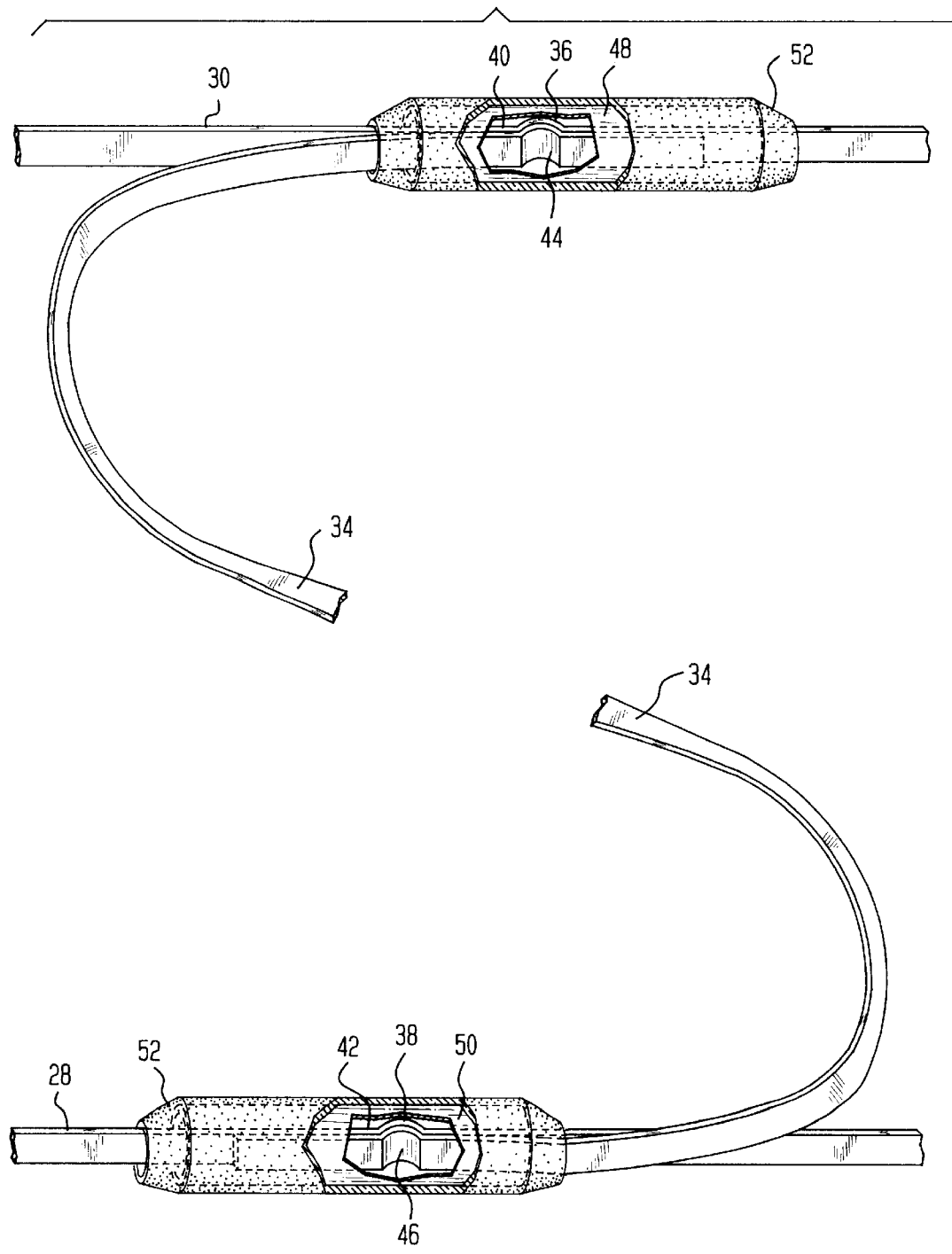
FIG. 2 is a partial front elevational view of the spring assembly of the FIG. 1 and shows the details of the interconnection of the upper and the lower rings when the spill-collection tank is in the erected condition.

Turning now to FIGS. 2 and 3, partial views of the truss or spring assembly 24 are shown. The extended view, FIG. 2, with the sidewall 16 erected, most clearly shows the construction. The S-shaped springs 34 and bands 28 and 30, which are fabricated from tempered, spring steel, are crimped and clamped together as described in more detail below. The band 28 is exemplary of the clamping/affixing arrangement used also for band 30 and at either end of each spring 34. The spring material is substantially rectangular in cross section having two edges and two faces and the material bends or folds in a plane substantially normal to the face. For attaching each spring 34, two crimps 36 and 38 are made in the receiving portions 40 and 42 of bands 28 and 30, respectively. In each spring 34, two corresponding, nesting crimps 44 and 46, respectively, are constructed. Compression fittings 48 and 50 are provided holding the two receiving portions 40 and 42 to the corresponding crimped sections 36, 38, 44 and 46 nesting one within the other. The compression fittings are preferably of a tubular, malleable metallic body which is conformed by pressure to the juncture. Optionally, the joint is completed by covering with a heat shrink tubing 52, which after emplacement is heat shrunk to cover the corners and edges. This prevents tearing of the urethane/nylon laminate during erection of the tank. The springs 34 are connected in a similar fashion to bands 28 and 30, except that prior to affixation each spring end portion 54 and 56 is twisted 90° to the spring body 58. The faces of bands 28 and 30 are then parallel to the respective faces of spring end portions 54 and 56 and can be joined to one another in the fashion just described. By joining springs 34 to bands 28 and 30, a circular spring truss is formed which provides a mechanism for erecting wall 16. It has been found that because of the folding arrangement described in more detail below, the S-shaped springs are preferably substantially evenly spaced along the bands 28 and 30. Also, the springs 34 should not be arranged in multiples of three, that is, sets of three, six, or nine springs, since, upon folding, stacks of springs occur at the 0-, 120- and 240-degree points. Thus, sets of four, five, seven, or eight springs 34 are used with the springs are attached at 0, 90, 180 and 270 degrees for four springs 34; at 0, 72, 144, 216, and 288 degrees for five springs, etc. Although an arrangement of springs herein described is in terms of bands and S-springs forming a truss-like or beam structure, it is possible that the same could be accomplished with other spring truss arrangements, as for example, one in which spring end portions 54 and 56 were extended and attached to one another without utilizing separate bands 28 and 30. Referring more specifically to FIG. 3, the compressed view of spring assembly 24 is shown. As upper band 30 is drawn downwards towards lower band 28, each S-shaped spring 34 is constructed to form a figure-eight configuration 60. The spring body 58 then is evenly distributed in flat loop 62 and 64. When compressed as just described, th e spill-collection tank 10 of this invention approaches a flat, disk-shaped body.

Figure 4:
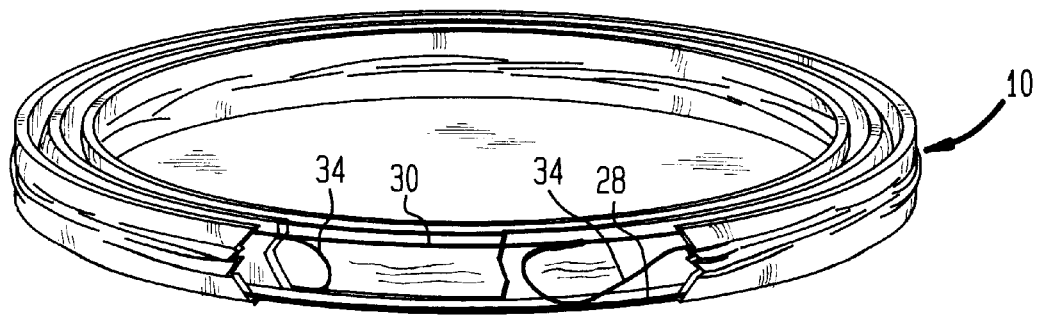
FIG. 4 is a perspective view of the spill-collection tank of the present invention in the folded condition, and is shown with the sidewall partially broken away to illustrate the side-by-side arrangement of the spring assemblies thereof; and, FIG. 5 is a detailed view showing the tie-down arrangement for the spill-collection tank in the folded condition.

Referring now to FIGS. 4 and 5, the spring tie-down apparatus and the folded tank assemblage is shown. For purposes of this discussion, a fold ed metal band such as a band-saw blade is used as an example. A "band-type fold" is defined for this application as a large band which is draped and, upon the lowermost points being drawn together, forms a folded band configuration with a perimeter one-third the size of the original opened band configuration. While band-type folds are known, the use thereof in combination with a spring truss is not known. The spring restraint 66 is constructed to hold S-shaped spring 34 in the figure-eight configuration 60. Upon engagement, strap 68 having a snap-type or Velcro$^R$ fastener 70 is attached to the corresponding snap portion or Velcro receiving pad 72. In the example, an eight-spring truss 24 is shown folded and results in springs at the 0-, 45-, 90-, 135-, 180-, 225-, 270-, 315-degree locations in both the folded and the unfolded condition.

In operation, the folded spill-containment tank is removed from storage and is unfolded near the site of the spilling liquid. It is unfolded with the underside of the base faced downward. The straps holding springs (under compression for folding) are released. The sidewalls now pop up to erect the wall in a substantially vertical fashion and are limited in height by the pocket configuration. The erected tank is now supported at a point on the periphery and the circular spring truss now acts as a beam which cantilevers the remaining unsupported portion of the tank. The tank may now be emplaced in the most advantageous position under the spill. After filling the tank, it may be pumped out by a disposal operation and the urethane surface cleaned using recommended procedures. The spring restraints are then re-applied and the tank folded in the band-type fold.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A land-based spill-containment tank for receiving spilled liquids, said tank being foldable for storage and being a spring-operated, pop-up device for liquid collection comprising:

a base of flexible material;

a wall integral with said base attached at the periphery thereof and arising therefrom;

a pocket formed in said wall, said pocket having an inner facing of flexible material contiguous to and continuous with an outer facing of flexible material; and, a spring truss fitted within said pocket forming a wall erecting mechanism, said spring truss circumferentially disposed about said base adjacent the juncture of said wall and said base, said spring truss substantially vertically expandable within said pocket to erect the wall with sufficient tension to resist, when the spill-containment tank formed thereby is filled with spilled liquid, significant diminution of the wall height, said spring truss, upon erection of said wall and before filling with spilled liquids, provides a beam which is supportable at one portion thereof to cantilever the tank during positioning.

2. A land-based spill-containment tank as described in claim 1 wherein said spring truss is substantially vertically compressible within said pocket to collapse the wall to a sufficiently flat configuration to enable band-type folding of the tank.

3. A land-based spill-containment tank as described in claim 2 wherein said spring-loaded truss further comprises:

a lower ring member forming one end of said wall erecting mechanism;

upper ring member forming the other end of said wall erecting mechanism;

a plurality of springs interconnecting at spaced intervals said lower and said upper ring members, each said spring connected at one end to said lower ring member and at the other to said upper ring member and, upon expansion within the pocket, raising the wall to a substantially vertical position; and, said upper ring member and said lower ring member, with the springs compressed, foldable for storage with a band-type fold.

4. A land-based spill-containment tank as described in claim 3 wherein each of said plurality of springs is S-shaped and the axis of each is substantially equidistantly located, the one from the other, on said upper ring member and on said lower ring member.

5. A land-based spill-containment tank as described in claim 4 wherein said plurality of S-shaped springs is a group of four springs substantially located at 0, 90, 180 and 270 degrees, respectively, on said upper ring member and on said lower ring member.

6. A land-based spill-containment tank as described in claim 4 wherein said plurality of S-shaped springs is a group of five substantially located at 0, 72, 144, 216, and 288 degrees, respectively, on said upper ring member and on said lower ring member.

7. A land-based spill-containment tank as described in claim 4 wherein said plurality of S-shaped springs is a group of eight springs substantially located at 0, 45, 90, 135, 180, 225, 270, and 325 degrees, respectively, on said upper ring member and on said lower ring member.

8. A land-based spill-containment tank for receiving spilled liquids, said tank being foldable for storage and being a spring-operated, pop-up device for liquid collection comprising:

a base of flexible material;

a wall integral with said base attached at the periphery thereof and arising therefrom;

a pocket formed in said wall, said pocket having an inner facing of flexible material contiguous to and continuous with an outer facing of flexible material;

a spring truss fitted within said pocket forming a wall erecting mechanism, said spring truss circumferentially disposed about said base adjacent the juncture of said wall and said base, said spring truss substantially vertically expandable within said pocket to erect the wall with sufficient tension to resist, when the spill-containment tank formed thereby is filled with spilled liquid, significant diminution of the wall height, said spring truss, in turn, further comprises;

a lower ring member forming one end of said wall erecting mechanism;

upper ring member forming the other end of said wall erecting mechanism;

a plurality of springs interconnecting at spaced intervals said lower and said upper ring members, each said spring connected at one end to said lower ring member and at the other to said upper ring member and, upon expansion within the pocket, raising the wall to a substantially vertical position; and, said spring truss, upon erection of said wall and before filling with spilled liquids, provides a beam which is supportable at one portion thereof to cantilever the tank during positioning.

9. A land-based spill-containment tank as described in claim 8 wherein said spring truss is substantially vertically compressible within said pocket to collapse the wall to a sufficiently flat configuration for band-type folding of the tank for storage.

10. A land-based spill-containment tank as described in claim 9 wherein each of said plurality of springs is S-shaped and the axis of each is substantially equidistantly located, the one from the other, on said upper ring member and on said lower ring member.

11. A land-based spill-containment tank as described in claim 10 wherein said plurality of S-shaped springs is a group of four substantially located at 0, 60, 120, 180, 240, and 300 degrees, respectively, on said upper ring member and on said lower ring member.

12. A land-based spill-containment tank as described in claim 10 wherein said plurality of S-shaped springs is a group of five substantially located at 0, 72, 144, 216, and 288 degrees, respectively, on said upper ring member and on said lower ring member.

13. A land-based spill-containment tank for receiving spilled liquids, said tank being foldable for storage and being a spring-operated, pop-up device for liquid collection comprising:

a base of flexible material;

a wall integral with said base attached at the periphery thereof and arising therefrom;

a pocket formed in said wall, said pocket having an inner facing of flexible material contiguous to and continuous with an outer facing of flexible material;

lower ring means for securing one end of a wall erecting mechanism, said lower ring means circumferentially disposed about said base and within said pocket adjacent the juncture of said wall and said base;

upper ring means for securing the other end of a wall erecting mechanism circumferentially disposed about said base and within said pocket;

a plurality of S-shaped springs interconnecting at spaced intervals said lower ring and said upper ring, each said S-shaped ring connected at one end to said lower ring and at the other to said upper ring and, upon expansion within the pocket, erecting the wall with sufficient tension to resist significant diminution of wall height when filled with spilled liquid;

said S-shaped springs compressible for folding of the spill-collection tank; and, said upper ring means and said lower ring means, with the S-shaped springs compressed, foldable for storage.

14. A land-based spill-containment tank as described in claim 13 wherein said flexible material of said base and of said wall is a nylon web laminated in a thermoplastic body.

15. A land-based spill-containment tank as described in claim 14 wherein said thermoplastic body is urethane.

16. A land-based spill-containment tank as described in claim 15 wherein said wall further comprises;

spring restraint means for holding compressed springs in place during storage, said spring restraint means having a strap portion and a fastener portion operable between a fastened condition and a released condition.

17. A land-based spill-containment tank as described in claim 16 wherein the axis of each of said plurality of S-shaped springs is substantially equidistantly located, the one from the other, on said upper ring means and on said lower ring means.

18. A land-based spill-containment tank as described in claim 17 wherein said plurality of S-shaped springs is a group of four springs substantially located at 0, 90, 180 and 270 degrees, respectively, on said upper ring means and on said lower ring means.

19. A land-based spill-containment tank as described in claim 17 wherein said plurality of S-shaped springs is a group of five substantially located at 0, 72, 144, 216, and 288 degrees, respectively, on said upper ring means and on said lower ring means.

20. A land-based spill-containment tank as described in claim 17 wherein said plurality of S-shaped springs is a group of seven springs substantially located at 0, 45, 90, 135, 180, 225, 270, and 325 degrees, respectively, on said upper ring means and on said lower ring means.

* * * * *